US 7,058,879 B2

(12) United States Patent
Ramanzin

(10) Patent No.: US 7,058,879 B2
(45) Date of Patent: Jun. 6, 2006

(54) DATA TRANSMISSION SYSTEM, EQUIPMENT SUITABLE FOR SUCH A SYSTEM AND DATA TRANSMISSION METHOD

(75) Inventor: Yves Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 503 days.

(21) Appl. No.: 09/933,552

(22) Filed: Aug. 20, 2001

(65) Prior Publication Data

US 2002/0053060 A1    May 2, 2002

(51) Int. Cl.
*G06F 11/00* (2006.01)
(52) U.S. Cl. ...................................... 714/798
(58) Field of Classification Search ............... 714/798; 375/240.27, 240.28
See application file for complete search history.

(56) References Cited

U.S. PATENT DOCUMENTS

| 5,018,114 | A  | * | 5/1991 | Mackelburg et al. ........ 367/134 |
| 5,315,708 | A  | * | 5/1994 | Eidler et al. ................ 711/119 |
| 5,956,102 | A  | * | 9/1999 | Lane ....................... 348/425.4 |
| 6,438,728 | B1 | * | 8/2002 | Susnow ..................... 714/807 |
| 6,625,223 | B1 | * | 9/2003 | Wimmer et al. ............. 375/259 |
| 6,725,413 | B1 | * | 4/2004 | Ishida ........................ 714/758 |
| 6,754,280 | B1 | * | 6/2004 | Nguyen .................. 375/240.28 |

FOREIGN PATENT DOCUMENTS

| EP | 0831616 A2 | 3/1998 |
| EP | 0886398 A1 | 12/1998 |
| EP | 0905941 A1 | 3/1999 |
| WO | WO9851039 | 11/1998 |
| WO | WO9902003 | 1/1999 |

OTHER PUBLICATIONS

Budagavi et al. Wireless Video Communications, 1999, CRC Press LLC.*
RFC 791 Internet Protocol Specification, Sep. 1981, pp. 11-15.*

* cited by examiner

Primary Examiner—Guy J. Lamarre
(74) Attorney, Agent, or Firm—Larry Liberchuk

(57) ABSTRACT

A data transmission system is formed by a transmitter (50) for processing useful data for the purpose of forming series of information signals, and a receiver (51) for receiving and processing the transmitted series of information signals. In this system, integrity verification is provided for conditionally producing an error indication for the transmitted series of information signals whereby the transmitted series of information signals can be validated even in the case where the error indication appears. Thus, it is possible to transmit image data in a system that has a small bandwidth.

11 Claims, 4 Drawing Sheets

DATA TRANSMISSION SYSTEM, EQUIPMENT SUITABLE FOR SUCH A SYSTEM AND DATA TRANSMISSION METHOD

FIELD OF THE INVENTION

The invention relates to a transmission system for useful data, formed by
- at least a transmitting part comprising transmission circuits for processing the useful data for the purpose of forming series of information signals, and
- at least a receiving part comprising receiving circuits for processing said transmitted series of information signals, the receiving part comprising:
    - integrity verification means for producing at least an error indication of the transmitted information signals.

The invention also relates to a method of transmitting useful data.

The invention further relates to electronic equipment comprising a transmitting part and a receiving part, so that it becomes possible to transmit and receive information signals from such equipment.

BACKGROUND OF THE INVENTION

The invention finds interesting applications notably in mobile radio systems for which one wishes to transmit multi-media information signals. For this subject one may be referred to patent document PCT WO 99/02003, which describes a system for transmitting images. Thus, equipment forming a mobile telephone station may transmit and receive images.

In this type of system one is confronted with problems of errors which are caused by the transmission of these information signals over rather narrow passband channels which satisfy, for example, standard UIT H.223.

SUMMARY OF THE INVENTION

The present invention proposes a system of the type defined in the opening paragraph which permits easy transmission notably of multi-media type of information signals.

For this purpose, such a system is characterized in that said receiving circuits comprise means for validating transmitted series of information signals even if the error indication appears.

The idea of the invention is to tolerate several errors which are not of necessity fatal to the link and to recover information signals even if errors have been detected. It should also be borne in mind that several errors on an image have less importance than errors in management data, for example, those which manage the setting of communications of a GSM type of network. The latter are thus to be monitored more meticulously.

According to another characteristic feature of the invention, such a system in which the transmission circuits form a header for each series, is characterized in that the integrity verification means influence said headers.

This other characteristic feature thus proposes to limit the verification of series of information signals transmitted in this header, which simplifies the processing while a satisfactory result is produced.

A transmission method that can be applied to such a system is characterized in that it comprises the following steps:
positioning a header for the useful data to be transmitted,
analysis of said header to produce an error indication of the header,
acceptance of useful data for certain error indications.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF PREFERRED EMBODIMENTS

Figure 1:
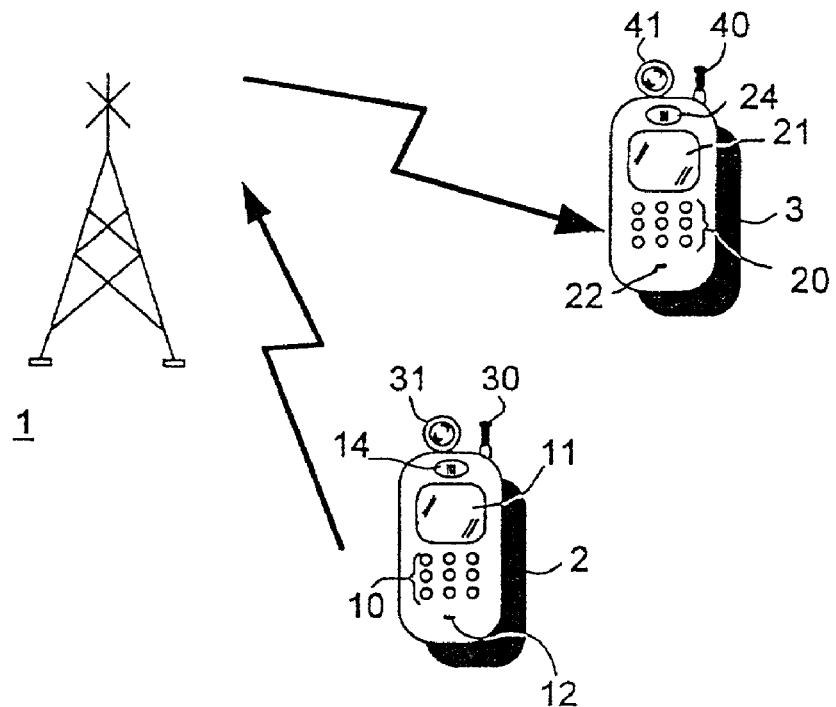
FIG. 1 shows a system in accordance with the invention.

In FIG. 1 is represented a system in accordance with the invention. Reference 1 indicates a base station and references 2 and 3, mobile stations. These mobile stations comprise on their front face:
- a keypad 10, a screen 11, a microphone 12, a loudspeaker 14 for station 2,
- a keypad 20, a screen 21, a microphone 22, a loudspeaker 24 for station 3, and installed on top:
- an antenna 30 and a television camera 31 for station 2,
- an antenna 40 and a television camera 41 for station 3.

Thanks to the system in accordance with the invention, the images captured by one of the cameras 31 or 41 may be made visible on the screen 11 or 21 of the other mobile station. These stations 2 and 3 are mobile radiotelephones that satisfy a standard of the GSM type. As, on the one hand, this standard allocates a passband that is small enough for the transmission of images and that, on the other hand, the transmission is made with comparatively reduced power, this image transmission is thus affected by errors.

Figure 2:
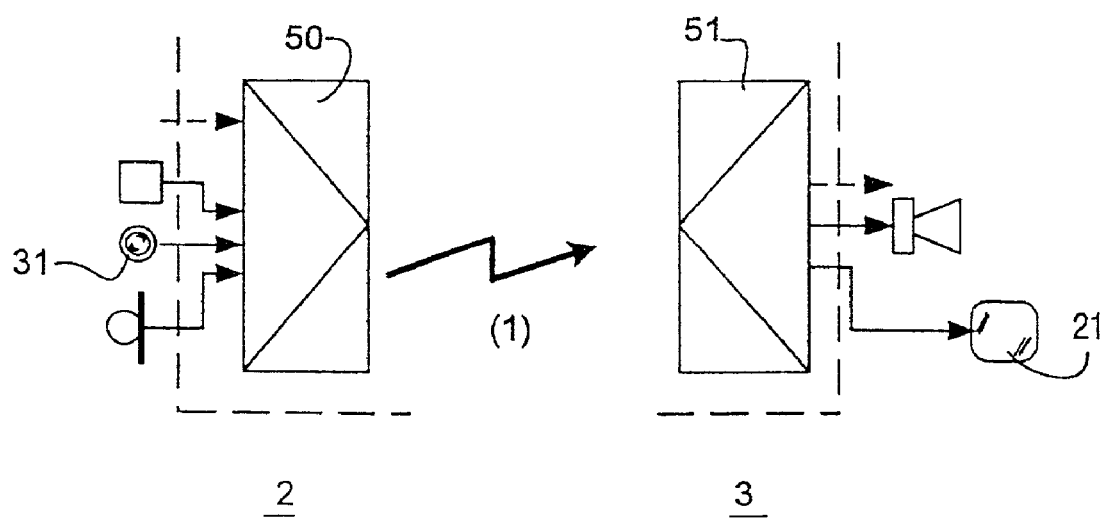
FIG. 2 shows in a diagrammatic manner the transmitting and receiving parts of the system in accordance with the invention.

FIG. 2 shows the diagram of the transmission between the two mobile stations 2 and 3. The transmission is considered of images in the direction from station 2 to station 3 while the base station 1 is passed along. The images in question are images captured by the camera 31 of station 2 to be displayed on screen 21 of station 3. To the useful data, which solely relate to the images, are added other data for the transmission management with a view to forming series of information signals which will be analyzed at the receiving part of station 3. All these data are multiplexed in the transmitting part 50 of the station 2 and are processed by the receiving part 51 of the station 3.

Figure 3:
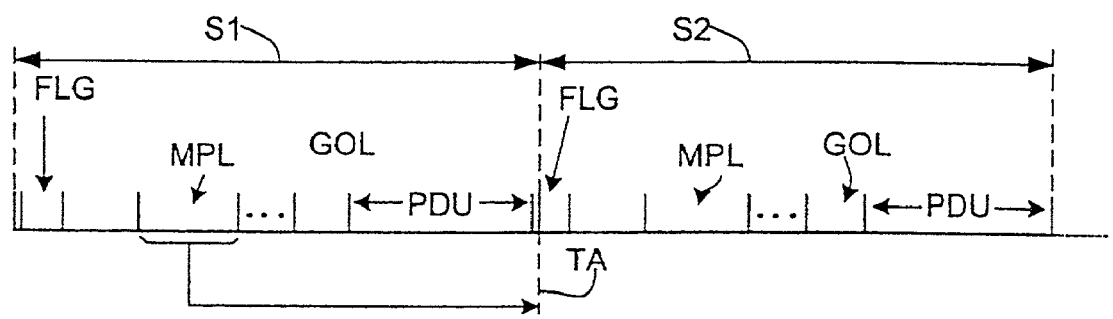
FIG. 3 shows the organization of transmitted series of information signals.

In FIG. 3 are represented two series of information signals S1 and S2. This FIG. 3 shows the positioning of these management data, which is notably the positioning of a synchronization data FLG (HDLC), a series length data MPL and a Golay code data as recommended in said standard UIT H.223. This coding information is referred to as GOL. Thereafter, the useful data PDU are transmitted.

The information MPL contained in the series S1 permits to determine the time TA at which the series of information signals S2 occurs.

Figure 4:
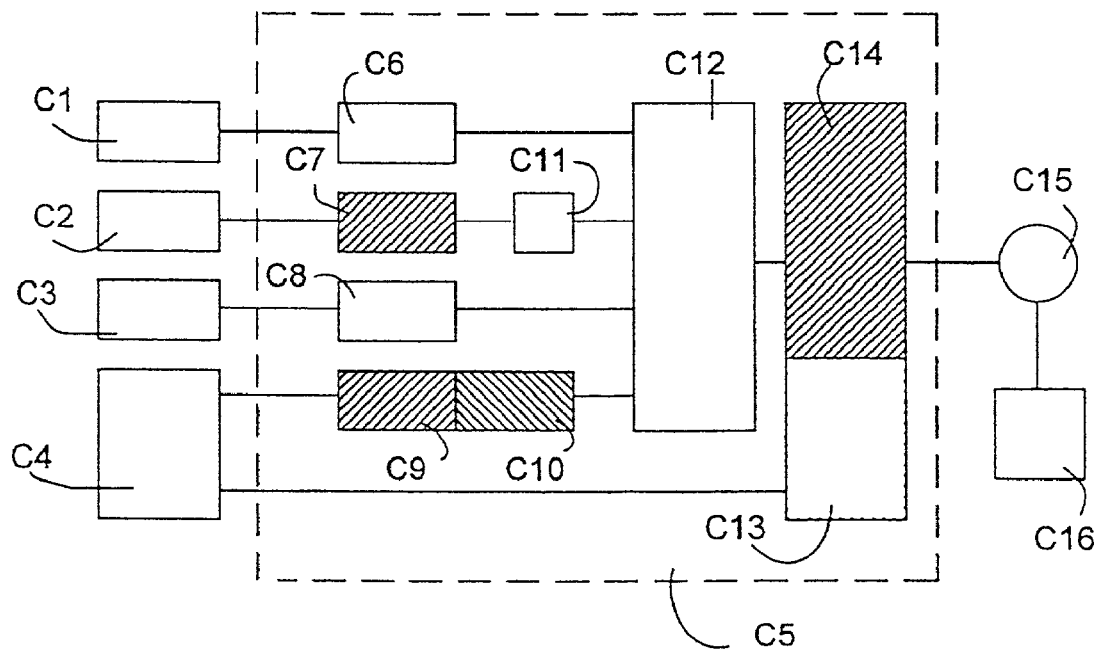
FIG. 4 shows a schematic diagram of the implementation of the invention in the framework of the standards cited above.

FIG. 4 summarizes the standards used in the example of embodiment described. Among the various boxes shown, C1 to C16, certain boxes are hatched to indicate the parts modified by the measures according to the invention.

Box C1 represents the input/output connections of video equipment,

Box C2 represents the input/output connections of audio equipment,

Box C3 represents the applications relating to the user and involving data,

Box C4 represents the control system of the system,

Box C5 represents the assembly of the boxes explained by Recommendations H.234

Box C6 represents a video codec according to the Recommendations H.263/H.261

Box C7 represents an audio codec according to the Recommendations G.723/G.723C, this box has been modified to manage a delay indicated by box C11, so as to ensure that there is a synchronization between image and sound.

Box C8 relates to the protocols concerning data of the user, for example, the file transfer.

Boxes C9 and C10 relate to the control protocol concerning the signaling of the system. It permits to control functions at either end of the link.

Box C12 represents the multiplexing and the demultiplexing of the various data. It is in this box that the headers are inserted, the length of the series of information signals and the encoding by means of the Golay code.

Boxes C13 and C14 relate to the modem functions for transmitting and receiving the various data.

Box C15 represents the GSM network.

Box K16 represents the multi-point control unit.

Figure 5:
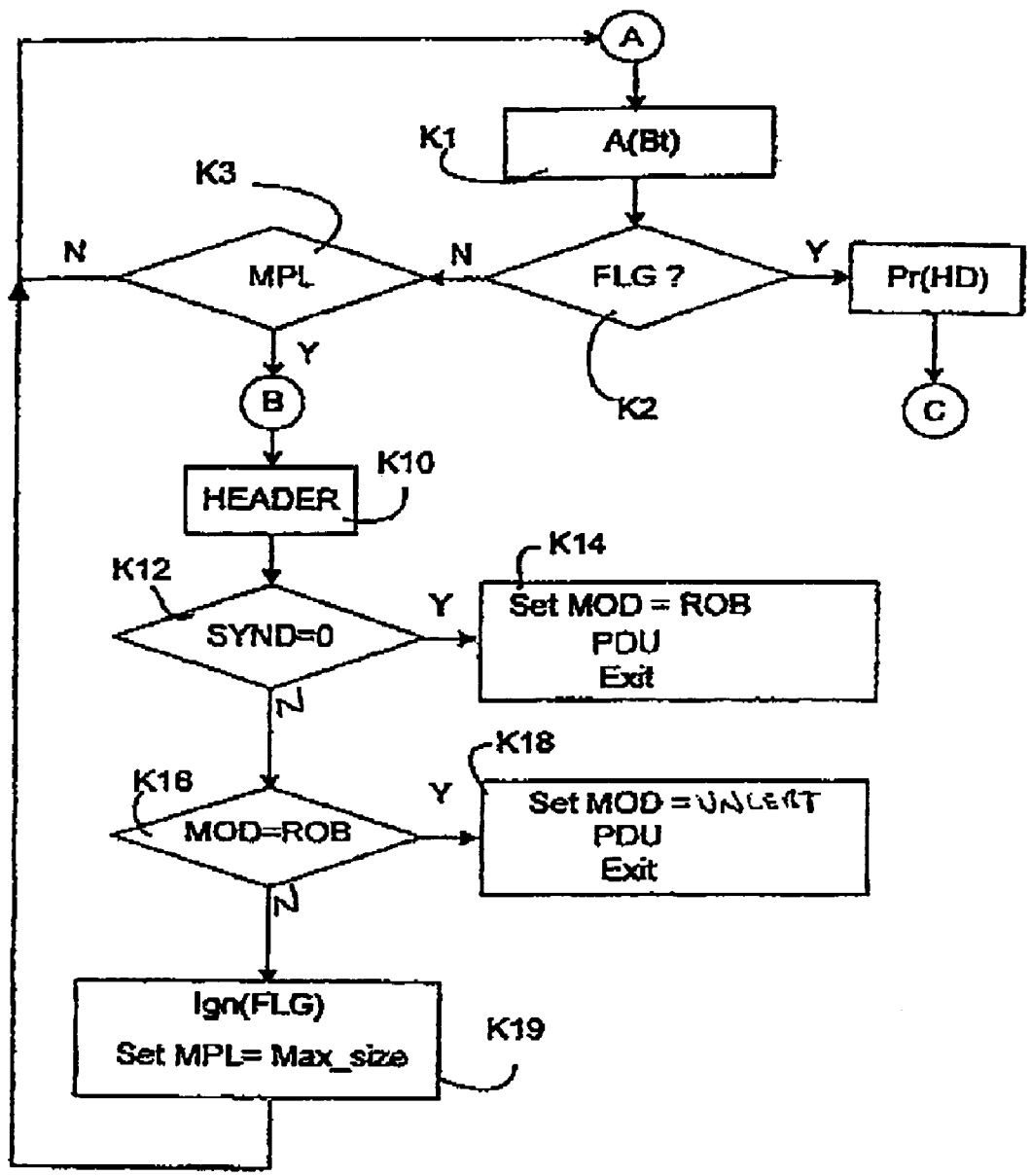
FIGS. 5 and 6 show a flow chart explaining the operation of the receiving part.
Figure 6:
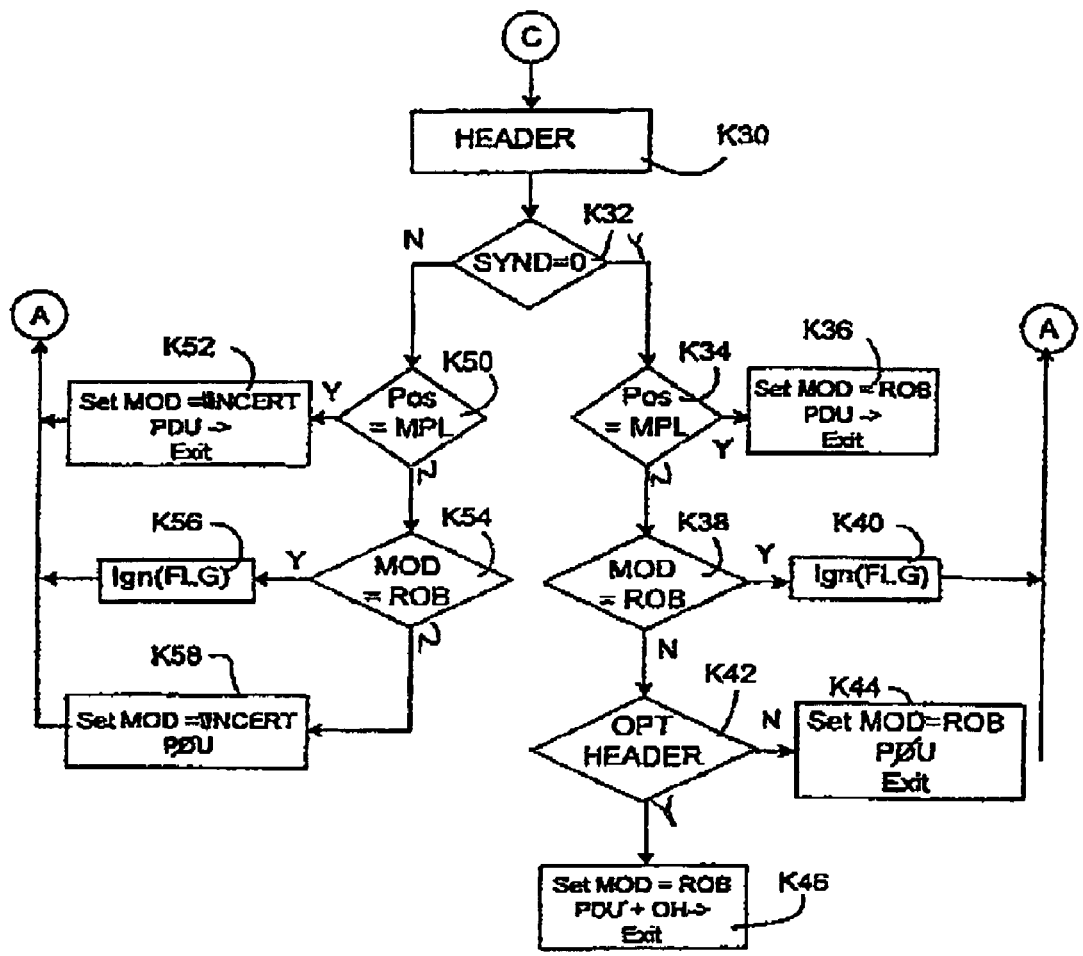

The operation of the system according to the invention is explained with the aid of flow charts of FIGS. 5 and 6.

In FIG. 5, box K1 indicates the analysis of the data stream with a view to the search for the indication FLG of the start of the series. This analysis is made of two octets. If these two octets do not contain the indication of synchronization (FLG) (box K2), an examination is made whether the whole series has been received or not (box K3). As long as the series has not been received, box K1 is returned to. If the whole series has been processed and the indication FLG has not been found, box K10 is proceeded to. In this box K10 a sufficient number of octets is processed to apply the calculations determining the Golay code syndrome cited above. If this syndrome indicates <<0>>, box K12, then the information signals are estimated to be valid and the <<Robust>> mode is proceeded to, box K14. If this syndrome is not equal to <<0>>, a test is made in box K16 whether or not one is in the <<Robust>> mode. If one is, box K18 is proceeded to. If the series is validated there, the <<Uncertain>> mode is proceeded to. If the test of the box K16 indicates a mode that is not the <<Robust>> mode, box K19 is proceeded to. The start indication is ignored and the variable MPL is set to the maximum length value that a series can reach. From there, box K1 is proceeded to.

The test indicated in box K2 may prove to be positive, operations shown in FIG. 6 are thus performed.

In FIG. 6 the processing indicated in box K30 is the same as that indicated in box K10. If the syndrome proves to be satisfactory, which is tested in box K32, box K34 is proceeded to, which is a test of the position found relative to that contained in the variable MPL. If the result of the test is positive, box K36 is proceeded to. There the <<Robust>> mode is changed to and the series of data is validated. If there is a conflicting situation with respect to these positions, tests are made in what mode one is (box K38). If one is in the <<Robust>> mode, the header is ignored and one thinks that this is the information (box K40). If one is not in this mode, an examination is made whether the option of standard H.223, which provides to send the information of the header of the preceding series in the header of the current series, is used (box K42). If this is not the case, box K44 is proceeded to, where the <<Robust>> mode is gone to and the series is rejected, otherwise the series is validated with the optional information contained in the current header and the <<Robust>> mode is proceeded to (box K46).

If the analyzed syndrome of box K32 is not satisfactory, box K50 is proceeded to and the position (the operating time of the information MPL) is examined. If this position is all right, box K52 is proceeded to, where the series is validated, but the <<Uncertain>> mode is proceeded to. If this position is not all right, an examination is made in box K54 in which mode one is. If one is in the <<Robust>> mode, the header is ignored, one thinks that this is information (box K56). If one is in the <<Uncertain>> mode, one remains there and rejects the series (box K58).

The indications of transmission errors are notably given by various tests indicated in FIGS. 5 and 6; for example, that of box K2, if the synchronization pattern has not been found, that of box K12 and box K32 when the syndrome is different from <<0>>.

The invention covers any transmitter and any receiver that utilizes the concepts of the present invention.

The invention claimed is:

1. A system, comprising:
a transmitter for processing and transmitting useful data for the purpose of forming a series of information signals;
a receiver for receiving and processing the transmitted series of information signals;
integrity verification means for conditionally producing an error indication of the transmitted series of information signals; and
means for validating the transmitted series of information signals in a first mode and rejecting the transmitted series of information signals in a second mode even if the error indication is produced by the integrity verification means.

2. The system of claim 1,
wherein the transmitter forms a header for the transmitted series of information signals; and
wherein the integrity verification means influences the header of the transmitted series of information signals.

3. The system of claim 2,
wherein the transmitter inserts positioning information into the header of the transmitted series of information signals; and
wherein the integrity verification means produces the error indication in response to a reception by the receiver of the transmitted series of information signals that is in non-conformity with the positioning information.

4. The system of claim 1,
wherein the transmitter inserts positioning information into a header of the transmitted series of information signals; and
wherein the integrity verification means produces the error indication in response to a reception by the receiver of the transmitted series of information signals that is in non-conformity with the positioning information.

5. The system of claim 1, further comprising:

means for distinguishing between the first mode of the system and the second mode of the system, wherein the first mode is permitted to accept more errors than the second mode.

6. A transmitter, comprising:

means for processing and transmitting useful data for the purpose of forming a series of information signals; and means for inserting positioning information into a header of the transmitted series of information signals wherein an error indication is produced in response to a reception by a receiver of the transmitted series of information that is in non-conformity with the positioning information whereby, despite the production of the error indication, the useful data is accepted in a first mode and rejected in a second mode.

7. A receiver, comprising:

means for receiving and processing a series of information signals transmitted to the receiver by a transmitter;

integrity verification means for conditionally producing an error indication of the transmitted series of information signals; and means for validating the transmitted series of information signals in a first mode and rejecting the transmitted series of information signals in a second mode even if the error indication is produced by the integrity verification means.

8. A method of transmitting useful data by a first series of information signals, the method comprising:

positioning a header for the useful data to be transmitted;

analyzing the header for conditionally producing an error indication of the header;

accepting the useful data in a first mode even if the error indication is produced; and rejecting the useful data in a second mode if the error indication is produced.

9. The method as claimed in claim 8, further comprising:

inserting error coding information into the header; and producing the error indication as a function of the error coding information.

10. The method as claimed in claim 8, further comprising:

inserting an indication of a length of the first series of information signals into the header; and producing the error indication in response to a failure of a second series of information signals to appear at an instant defined by the length indication.

11. The method as claimed in claim 8, further comprising:

distinguishing between the first mode and the second mode, wherein the first mode permits to accept more errors than the second mode for the purpose of validating the useful data.

\* \* \* \* \*